United States Patent [19]

Chatterjee

[11] 4,320,209
[45] Mar. 16, 1982

[54] AMIDE NUCLEATING AGENTS FOR BUTENE-1 POLYMER COMPOSITIONS

[75] Inventor: Ananda M. Chatterjee, Houston, Tex.

[73] Assignee: Shell Oil Company, Houston, Tex.

[21] Appl. No.: 214,148

[22] Filed: Dec. 8, 1980

[51] Int. Cl.$^3$ ............................................. C08L 23/20
[52] U.S. Cl. .......................................... 525/6; 525/3
[58] Field of Search ....................................... 525/6, 3

[56] References Cited

U.S. PATENT DOCUMENTS

| | | | |
|---|---|---|---|
| 3,265,648 | 8/1966 | Boor et al. | 525/5 |
| 3,367,926 | 2/1968 | Vocks | 525/4 |
| 3,575,931 | 4/1971 | Sherman | 525/6 |
| 3,756,997 | 9/1973 | Eichers et al. | 525/6 |

FOREIGN PATENT DOCUMENTS 1935239  1/1971  Fed. Rep. of Germany .......... 525/6

*Primary Examiner*—Edward J. Smith

[57] ABSTRACT

The crystallization from the melt of an isotactic butene-1 homopolymer composition or isotactic butene-1-ethylene copolymer composition is promoted by adding a small amount of a nucleating agent selected from the group consisting of 1-naphthalene acetamide; N-stearoyl-p-aminophenol; mercapto-N-2-naphthylacetamide; malonamide; nicotinamide; isonicotinamide; benzamide; salicylamide; and anthranilamide.

18 Claims, No Drawings

AMIDE NUCLEATING AGENTS FOR BUTENE-1 POLYMER COMPOSITIONS

BACKGROUND OF THE INVENTION

This invention relates to a method for enhancing the crystallization rate of thermoplastic butene-1 polymer compositions. More particularly, this invention is directed to the addition to a butene-1 polymer composition of small amounts of certain amides as nucleating agents, thereby promoting the crystallization of the polymer from the melt and affording compositions which exhibit improved properties, compared to the non-nucleated butene-1 base polymer composition.

Heterogeneous nucleation via the addition of a foreign material or nucleating agent is well known. See, for example, Chatterjee et al., *J. Polym. Sci.; Polym. Phys. Ed.*, Vol. 13, 2369–83 and 2385–90 (1975). As demonstrated therein, heterogeneous nucleation is highly selective and there is no evidence of a universally strong nucleating agent for all polymers. In other words, an effective nucleating agent for one polymer may be ineffective for even a closely related polymer; similarly, even a compound closely related to an effective nucleating agent for one polymer may be ineffective for that same polymer. Chatterjee et al. also disclosed the use of nylons (polyamides) as nucleating agents for polypropylene crystallization. Nucleation and specific nucleating agents are discussed in Binsbergen, *J. Polym, Sci.; Polym. Symposium*, Vol. 59, 11–29 (1977).

The use of a nucleating agent to accelerate the crystallization of polymers allows for faster processing and results in a more uniform microstructure because of the reduced size of the spherulites which form upon melt crystallization. The products also generally demonstrate improved physical and mechanical properties. See, for example, Rubin, *Injection Molding Theory and Practice*, pp. 192ff (1972). In general, a desirable nucleating agent is effective at low levels of addition, both for reasons of economy and the avoidance of undue foreign structural heterogeneity which may otherwise adversely affect the properties of the polymer. It has now been discovered that certain amides are highly effective nucleating agents, at low levels of addition, for butene-1 homopolymers and copolymers with ethylene.

Various additives for polyolefins are disclosed in U.S. Pat. Nos. 3,902,532 (higher fatty acid amide slip agents), 3,499,884 (nylon salts), 3,440,168 (nylon fibers) and 3,268,499 (lithium salts of isonicotinic acid and p-acetamido benzoic acid).

Belgian Pat. No. 695,803 and U.S. Pat. No. 3,756,997 disclose a variety of nucleating agents for butene-1 polymers. Specific examples include polypropylene, coumarone-indene resin, aluminum silicate, clay and aromatic sulfonic acids and their derivatives, including 4-amino benzene/sulfonic amide. Certain fatty acid amides are disclosed as nucleating agents for butene-1 polymers in my co-pending application Ser. No. 216,055, filed Dec. 15, 1980.

SUMMARY OF THE INVENTION

This invention is directed to a method for promoting crystallization from the melt of an isotactic butene-1 homopolymer or isotactic butene-1-ethylene copolymer having no more than about 15 mole percent of ethylene, which comprises adding to a composition comprising the homopolymer or copolymer about 0.02 to 5.0% by weight of a nucleating agent selected from the group consisting of 1-naphthalene acetamide; N-stearoyl-p-aminophenol; mercapto-N-2naphthylacetamide; malonamide; nicotinamide; isonicotinamide; benzamide; salicylamide; and anthranilamide.

The specified amides are highly effective nucleating agents at surprisingly low levels of addition. By promoting the more rapid crystallization of butene-1 polymers from the melt, they allow for faster processing and result in a product with a uniform microstructure. Corresponding improvements may also occur in physical and mechanical properties over non-nucleated polymers.

DESCRIPTION OF THE PREFERRED EMBODIMENTS

The butene-1 polymer composition to which the nucleating agent is added comprises an isotactic butene-1 homopolymer (polybutylene) or an isotactic butene-1-ethylene copolymer. The polymers used are suitably crystallizable thermoplastic butene-1 polymers with number average molecular weights above 15,000, preferably above 20,000, and an isotactic content above 85%, preferably above 90%, and more preferably above 95%, determined as the diethyl ether-insoluble component. Suitable butene-1-ethylene copolymers contain from about 0.1 to 15 mole percent and preferably from about 0.1 to 10 mole percent and more preferably from about 0.1 to 8 mole percent, of ethylene. The butene-1-ethylene copolymers are typically more difficult to crystallize at the same temperature than the butene-1 homopolymers. Suitable isotactic butene-1 polymers are commercially available and methods for their preparation are well known in the art, as shown in, for example, U.S. Pat. No. 3,362,940. Illustrative of butene-1 polymers suitable for use in the present invention (if the above requirements are met) are those known in the industry as pipe, film, molding or additive grades.

The nucleating agent added to the butene-1 polymer composition comprises an amide selected from the group consisting of 1-naphthalene acetamide; N-stearoyl-p-aminophenol; mercapto-N-2-naphthylacetamide; malonamide; nicotinamide; isonicotinamide; benzamide; salicylamide; and anthranilamide. As used herein, the term "amide" refers to an organic compound containing at least one

moiety. The molecular structures of the nucleating agents are shown below:

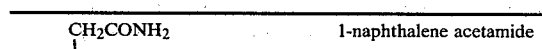   1-naphthalene acetamide

   N-stearoyl-p-aminophenol

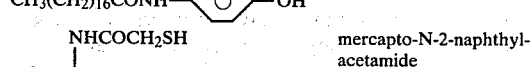   mercapto-N-2-naphthylacetamide

   malonamide

-continued

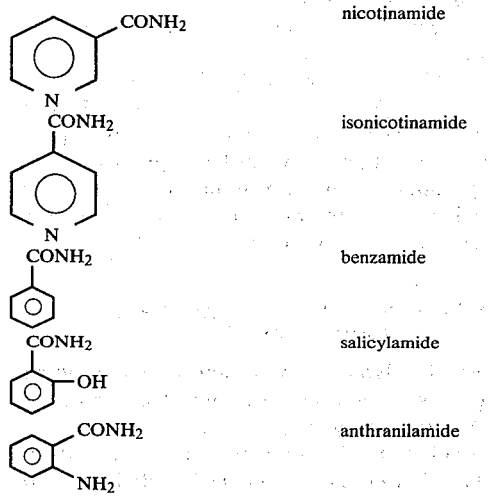

| | |
|---|---|
| nicotinamide | |
| isonicotinamide | |
| benzamide | |
| salicylamide | |
| anthranilamide | |

The nucleating agents are well known compounds and are commercially available. Preferred nucleating agents for addition to the butene-1 homopolymer are selected from the group consisting of 1-naphthalene acetamide; N-stearoyl-p-aminophenol; mercapto-N-2-naphthylacetamide; malonamide; nicotinamide; isonicotinamide; benzamide; and anthranilamide, with 1-naphthalene acetamide being more preferred. Preferred nucleating agents for addition to the butene-1-ethylene copolymers are selected from the group consisting of 1-naphthalene acetamide; benzamide; and salicylamide. 1-Naphthalene acetamide is the nucleating agent of choice for addition to the butene-1-ethylene copolymers.

The nucleating agent is added to the butene-1 homopolymer composition in an amount of from about 0.02 to 5.0% by weight, preferably from about 0.05 to 2.5% by weight and more preferably from about 0.1 to 1.0% by weight of the polymer composition-nucleant blend. The nucleating agent is added to the butene-1-ethylene copolymer composition in an amount of from about 0.02 to 5.0% by weight, preferably from about 0.1 to 2.5% by weight and more preferably from about 0.1 to 1.0% by weight of the polymer composition-nucleant blend. Generally, the crystallization rate rises and tends to level off with increasing concentration of the nucleating agent. However, some of the nucleating agents, for example 1-naphthalene acetamide, may exhibit their optimum or peak nucleating effect at a concentration below that at which the crystallization rate levels off. Preferred amounts of addition of the nucleating agent will therefore depend in part on its purity and cost; avoidance of undue structural heterogeneity and the additive and the desired crystallization rate, properties and end use of the finished composition are further considerations. The use of a finely divided or powdered nucleating agent is preferred. The method used to mix the components is not critical so long as the nucleating agent is well dispersed in the butene-1 polymer composition; conventional mixing equipment can be used, for example, a Brabender mixing head, single-screw or twin-screw extruder or Banbury mixer.

For convenience, various conventional fillers, stabilizers, processing aids, pigments and/or other materials can be added to the butene-1 polymer composition, if desired, at the same time as the nucleating agent. The nucleating agent of this invention may be used, if desired, with other known nucleating agents for butene-1 polymers, for example, the aromatic sulfonic acids disclosed in U.S. Pat. No. 3,756,997. As another example, carbon black, a relatively weak nucleating agent which also acts as a pigment and ultraviolet screen, can be added with the nucleating agent of the invention to polymers for which an end use involving exposure to sunlight is contemplated, e.g. pipe. The nucleating agent of the invention can also be used in a form containing other materials or impurities, which may or may not exhibit any nucleating effect. In this event, it is understood that these other materials or impurities are excluded when calculating the added concentration of the nucleating agent of the invention.

The thermoplastic polymer composition-nucleant blend prepared according to the invention may be used in various fabrication equipment, including extrusion, thermoforming, blow molding, rotomolding, injection molding and other molding equipment, for the manufacture of pipe, film, molded articles and other items. Generally, butene-1 homopolymer compositions are preferred for the manufacture of pipe and butene-1-ethylene copolymer compositions are preferred for the manufacture of film. The polymer composition-nucleant blend crystallizes quickly and uniformly from the melt, allowing for increased speed of processing. Improvements in physical and mechanical properties of the finished items are also achieved; for example, improved tensile properties, less brittleness and/or increased resistance to cracking are exhibited by thick-walled pipe prepared from the thermoplastic blends of the invention.

The invention is illustrated further in the following examples, which are not to be construed as limiting its scope. In the examples, the butene-1 polymers are denoted as follows:

PB-A: pipe grade butene-1 homopolymer with melt index of 0.35 dg/min and number average molecular weight of 73,300

PB-B: butene-1-ethylene copolymer (1.5 mole % ethylene) with melt index of 0.91 dg/min and number average molecular weight of 60,000

PB-C: butene-1-ethylene copolymer (8 mole % ethylene) with melt index of 0.2 dg/min and number average molecular weight of 91,200

ASTM D-1238 Condition E was used to measure the stated melt indices. The blends of the butene-1 polymer and the nucleating agent were prepared by mixing in a Brabender mixing head at 175° C. (190° C. in the case of 1-naphthalene acetamide), 60 RPM for 5 minutes, with a nitrogen purge to avoid oxidative degradation. Nucleating efficiency was compared in two ways: the isothermal crystallization half-time and the crystallization temperature. The crystallization half-time ($t_{\frac{1}{2}}$) in minutes was measured at a constant temperature using a differential scanning calorimeter: 90° C. for PB-A, 75° C. for PB-B and 45° C. for PB-C. Prior to isothermal crystallization, the samples were melted at 150° C. and cooled to the specified crystallization temperature at the rate of 10° C. per minute. The crystallization temperature ($T_c$) in °C. was measured at a constant cooling rate using a differential scanning calorimeter. The samples were melted at 150° C. and then cooled at the rate of 10° C. per minute; the temperature corresponding to the exothermic crystallization peak was taken as $T_c$. A lower $t_{\frac{1}{2}}$ or a higher $T_c$ for a given polymer indicates a better nucleating agent. The data for $t_{\frac{1}{2}}$ is shown as being less than (<) the state value in experiments where the crystallization proceeded too rapidly to allow a more exact value to be accurately measured.

The nucleating agents used in the examples were reagent grade compounds and are denoted as follows:

| | |
|---|---|
| 1-naphthalene acetamide | N-1 |
| N-stearoyl-p-aminophenol | N-2 |
| mercapto-N-2-naphthylacetamide | N-3 |
| malonamide | N-4 |
| nicotinamide | N-5 |
| isonicotinamide | N-6 |
| benzamide | N-7 |
| salicylamide | N-8 |
| anthranilamide | N-9 |

Nucleants N-1 and N-3 to N-7 were obtained from Eastman Organic Chemicals, and nucleant N-2 was obtained from Mallinckrodt, Inc., nucleants N-8 and N-9 were obtained from Pfaltz and Bauer. The nucleating efficiency of the following compounds (not according to the invention) were also tested for comparison purposes:

| | |
|---|---|
| acetanilide | N-12 |
| 2-chloroacetamide | N-13 |
| naphthalene | N-14 |

Compounds N-12 and N-13 were obtained from Eastman Organic Chemicals and compound N-14 was obtained from BDH Chemicals.

EXAMPLE I

In this series of experiments, the efficiencies of eleven nucleating agents according to the invention were tested at the indicated levels with a butene-1 homopolymer (PB-A). The results are shown below in Table I. Values of $t_{\frac{1}{2}}$ and $T_c$ for non-nucleated butene-1 homopolymer are given for comparison purposes (example I-1). It may be observed that the amides of the invention were highly effective nucleating agents for butene-1 homopolymer. However, the compounds not according to the invention (N-12 to N-14) showed little or no nucleating effect, despite their structural similarities to several of the effective nucleants N-1 to N-9. This demonstrates again the high selectivity of heterogeneous nucleation. As may be observed from the $t_{\frac{1}{2}}$ value in Example I-14, salicylamide (N-8) was an ineffective nucleant at 90° C. This is thought to be due to the fact that the temperature for the measurement was too high; salicylamide was an effective nucleating agent at lower temperatures as evidenced by the $T_c$ value in Example I-14.

TABLE I

| | Nucleation of Butene-1 Homopolymer | | |
|---|---|---|---|
| Example | Nucleant | $t_{\frac{1}{2}}$ (min) at 90° C. | $T_c$ (°C.) |
| I-1 | none | 8.68 | 68.7 |
| I-2 | 0.1% N-1 | 4.53 | 75.0 |
| I-3 | 0.2% N-1 | <0.25 | 89.5 |
| I-4 | 0.3% N-1 | <0.25 | 88.0 |
| I-5 | 0.5% N-1 | <0.27 | 86.5 |
| I-6 | 1.0% N-1 | <0.25 | 86.0 |
| I-7 | 0.5% N-2 | 1.38 | 81.5 |
| I-8 | 0.5% N-3 | 1.35 | 81.5 |
| I-9 | 0.5% N-4 | 1.42 | 81.2 |
| I-10 | 0.5% N-5 | 1.21 | 81.3 |
| I-11 | 0.5% N-6 | 1.38 | 78.5 |

TABLE I-continued

| | Nucleation of Butene-1 Homopolymer | | |
|---|---|---|---|
| Example | Nucleant | $t_{\frac{1}{2}}$ (min) at 90° C. | $T_c$ (°C.) |
| I-12 | 0.5% N-7 | 0.54 | 74.0 |
| I-13 | 0.5% N-8 | 14.8 | 79.2 |
| I-14 | 0.5% N-9 | 1.92 | 78.8 |
| I-15 | 0.5% N-12* | 10.56 | 66.5 |
| I-16 | 0.5% N-13* | 7.00 | 66.7 |
| I-17 | 0.5% N-14* | 11.53 | 70.5 |

*not according to invention

EXAMPLE II

In this series of experiments, the efficiencies of the indicated nucleating agents were tested with butene-1-ethylene copolymers. The results are shown below in Table II. Values of $t_{\frac{1}{2}}$ and $T_c$ for the non-nucleated copolymers are given for comparison purposes (Examples II-1 and II-8). The data show 1-naphthalene acetamide (N-1), benzamide (N-7) and salicylamide (N-8) as highly effective nucleating agents.

TABLE II

| | Nucleation of Butene-1 Copolymers | | | |
|---|---|---|---|---|
| | | $t_{\frac{1}{2}}$ (min) at | | |
| Example | Formulation | 75° C. | 45° C. | $T_c$ (°C.) |
| II-1 | PB-B | 6.58 | — | 48.4 |
| II-2 | PB-B + 0.1% N-1 | 1.42 | — | 65.0 |
| II-3 | PB-B + 0.2% N-1 | <0.25 | — | 73.5 |
| II-4 | PB-B + 0.3% N-1 | <0.25 | — | 71.5 |
| II-5 | PB-B + 0.5% N-1 | 0.49 | — | 70.2 |
| II-6 | PB-B + 1.0% N-1 | <0.25 | — | 72.0 |
| II-7 | PB-B + 0.5% N-7 | <0.25 | — | 69.5[a] |
| II-8 | PB-C | — | 8.13 | 10.5 |
| II-9 | PB-C + 0.2% N-1 | — | <0.25 | 43.5 |
| II-10 | PB-C + 0.5% N-1 | — | 1.23 | 34.0 |
| II-11 | PB-C + 1.0% N-1 | — | <0.40 | 38.0 |
| II-12 | PB-C + 1.0% N-8 | — | <0.25 | 42.0 |

[a] A secondary exothermic peak was observed at 57.5° C.

What is claimed is:

1. A method for promoting crystallization from the melt of an isotactic butene-1 homopolymer or isotactic butene-1-ethylene copolymer having no more than about 15 mole percent of ethylene, which comprises adding to a composition comprising the homopolymer or copolymer about 0.02 to 5.0% by weight of a nucleating agent selected from the group consisting of 1-naphthalene acetamide; N-stearoyl-p-aminophenol; mercapto-N-2-naphthylacetamide; malonamide; nicotinamide; isonicotinamide; benzamide; salicylamide; and anthranilamide.

2. The method as defined in claim 1, wherein the nucleating agent is added to the composition comprising the butene-1 homopolymer.

3. The method as defined in claim 2, wherein the nucleating agent is selected from the group consisting of 1-naphthalene acetamide; N-stearoyl-p-aminophenol; mercapto-N-2-naphthylacetamide; malonamide; nicotinamide; isonicotinamide; benzamide; and anthranilamide.

4. The method as defined in claim 2, wherein the nucleating agent is 1-naphthalene acetamide.

5. The method as defined in claim 1, wherein the nucleating agent is added to the composition comprising the butene-1-ethylene copolymer.

6. The method as defined in claim 5, wherein the butene-1-ethylene copolymer contains from about 0.1 to 10 mole percent of ethylene.

7. The method as defined in claim 5, wherein the butene-1-ethylene copolymer contains from about 0.1 to 8 mole percent of ethylene.

8. The method as defined in claim 5, wherein the nucleating agent is selected from the group consisting of 1-naphthalene acetamide; benzamide; and salicylamide.

9. The method as defined in claim 7, wherein the nucleating agent is selected from the group consisting of 1-naphthalene acetamide; benzamide; and salicylamide.

10. The method as defined in claim 5, wherein the nucleating agent is selected from the group consisting of 1-naphthalene acetamide; benzamide; and salicylamide.

11. The method as defined in claim 5, wherein the nucleating agent is 1-naphthalene acetamide.

12. The method as defined in claim 7, wherein the nucleating agent is 1-naphthalene acetamide.

13. The method as defined in claim 2, wherein the nucleating agent is added to the composition in an amount of from about 0.05 to 2.5% by weight.

14. The method as defined in claim 2, wherein the nucleating agent is added to the composition in an amount of from about 0.1 to 1.0% by weight.

15. The method as defined in claim 5, wherein the nucleating agent is added to the composition in an amount of from about 0.1 to 2.5% by weight.

16. The method as defined in claim 9, wherein the nucleating agent is added to the composition in an amount of from about 0.1 to 2.5% by weight.

17. The method as defined in claim 5, wherein the nucleating agent is added to the composition in an amount of from about 0.1 to 1.0% by weight.

18. The method as defined in claim 9, wherein the nucleating agent is added to the composition in an amount of from about 0.1 to 1.0% by weight.

* * * * *